Figure 1:
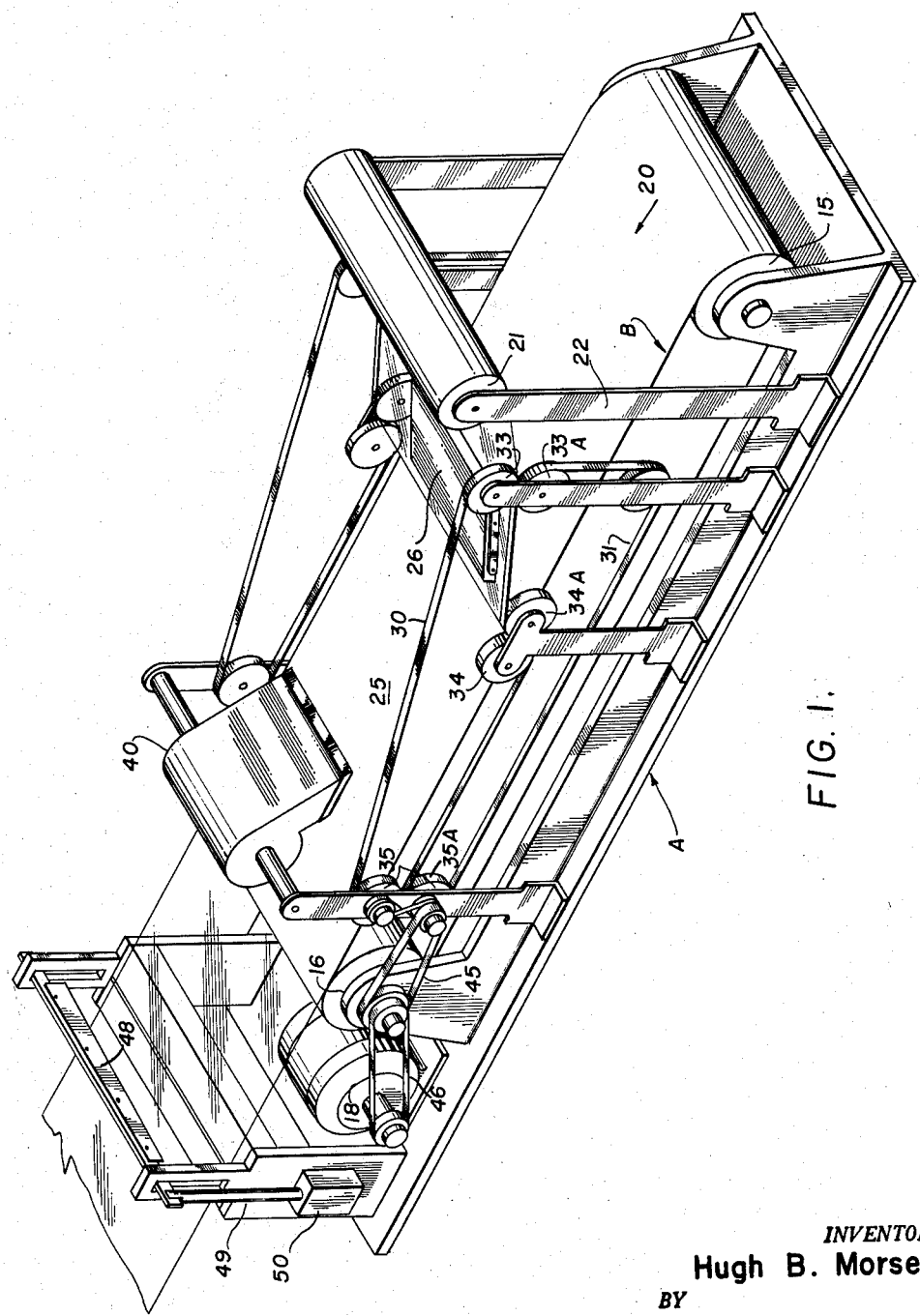

Jan. 8, 1963

H. B. MORSE 3,071,905

CONTINUOUS PACKAGING DEVICE

Filed June 1, 1960

2 Sheets-Sheet 1

FIG. I.

INVENTOR.
Hugh B. Morse
BY
Townsend and Townsend

Jan. 8, 1963  H. B. MORSE  3,071,905
CONTINUOUS PACKAGING DEVICE
Filed June 1, 1960  2 Sheets-Sheet 2

INVENTOR.
Hugh B. Morse
BY
Townsend and Townsend

United States Patent Office 3,071,905
Patented Jan. 8, 1963

3,071,905
CONTINUOUS PACKAGING DEVICE
Hugh B. Morse, San Jose, Calif., assignor, by mesne assignments, to Avery Industries, Inc., San Mateo, Calif., a corporation of California
Filed June 1, 1960, Ser. No. 33,144
10 Claims. (Cl. 53—22)

This invention relates to a device for continuously forming vacuum formed skin packages of the type in which a packaged article is mounted on an air permeable baseboard and wherein a thin plastic film is tightly adhered to the article and the baseboard.

Conventionally the vacuum formed packages of the type formed by this means are packaged by providing a platen with means for withdrawing air from the base of the platen. Thereafter an air permeable baseboard formed of cardboard or other similar material is mounted on the platen and the article to be packaged is mounted over the baseboard. A thin film of polyethylene, polystyrene or other similar material is then heated and drawn over the article and baseboard with the simultaneous application of a vacuum being formed by withdrawing air through the baseboard and the platen so that atmospheric pressure forces the sheet material tightly against the baseboard and article. Some form of adhesive is employed generally on the baseboard so that the sheet material will be firmly adhered to the baseboard. The entire baseboard with the sheet coating thereafter forms the packaging for the article.

Previously it has been necessary to package each article or group of articles in discretely separate operations in that the conventional machines merely employ relatively reciprocally movable elements which bring the baseboard and the polyethylene together at periodic intervals. This structure necessitates the periodic insertion of the unpackaged materials and removal of the packaged materials after the skin has been applied.

The principal object of this invention is to provide a continuous machine which incorporates a continuously moving belt upon which the articles mounted on their baseboards can be placed and in which the sheet of material is arranged to move along the moving belt in synchronization with the belt so as to come down on the article to be packaged with the simultaneous withdrawal of air. By this means the article is packaged while moving longitudinally with the belt. By this process the packaged articles can be continuously fed into the packaging position and the plastic skin can be continuously applied. Thereafter the baseboard and skin of the packaged article is cut into the individual packaging modules as required.

One of the principal advantages of this invention is that there are no reciprocally moving elements in that the entire operation is carried on in a continuously moving belt with the plastic film being drawn down while in a longitudinally moving state.

A feature of this invention is that articles can be fed onto the belt at random times due to the continuous nature of the packaging mechanism. Because of this feature there is no requirement of spacing between articles or timing between the placement of the article on the belt.

Another feature and advantage of this invention is that the device is continually moving in a forward direction so that there is no need for reciprocal start-stop motion.

A further feature and advantage of this invention is the provision of allowing the plastic film to be heated while moving in its longitudinal path to provide continuous heat application on the film through its travel to its mating position with the article to be packaged.

A further object of this invention is to provide a continuously operated machine for the vacuum packaging of articles in which the article to be packaged is moved along a foraminous belt while the plastic skin to cover the packaged article is continuously moved longitudinally down into position over the article to be packaged while being uniformly heated through its path of longitudinal travel.

Other objects of the present invention will become apparent upon reading the following specification and referring to the accompanying drawings in which similar characters of reference represent corresponding parts in each of the several views.

Figure 2:
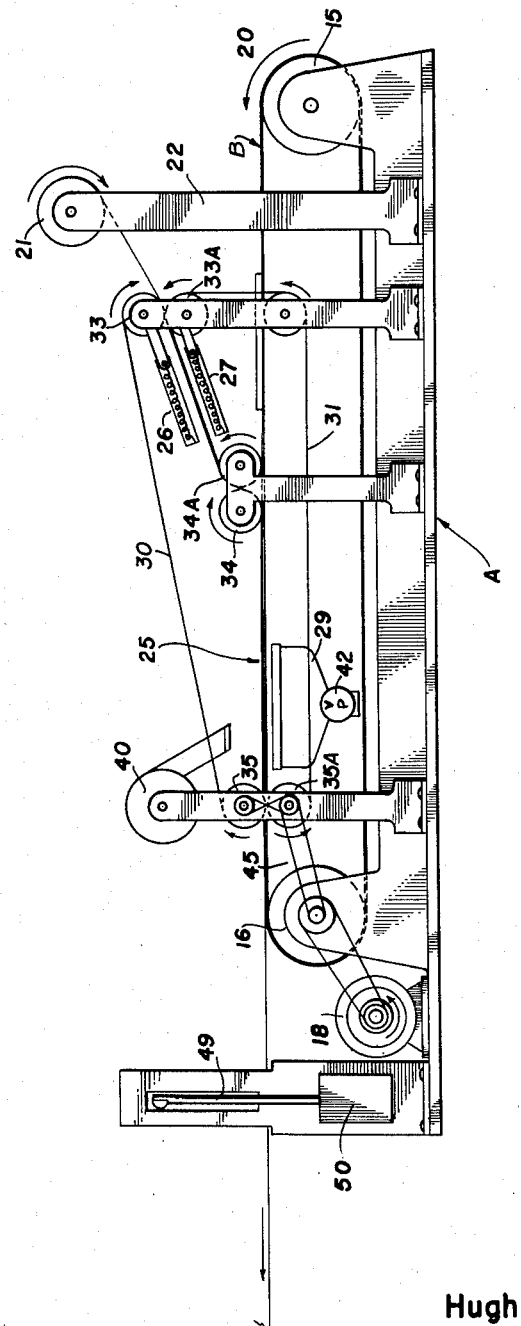

In the drawings:
FIG. 1 is a perspective view of the continuous packaging machine of this invention.
FIG. 2 is a side elevational view of the device shown in FIG. 1.

The principal embodiment of this invention comprises a packaging machine having a main frame generally indicated at A.

The main frame is adapted to support two spaced apart rollers 15 and 16 which are arranged to drive a foraminous package carrying belt B. One of the rollers is powered by a motor 18 in such a way that the top face of belt B is moved from right to left in the drawings as indicated by arrow 20.

A roll or web of polyethylene, polystyrene or other plastic film material 21 is supported by two vertical arms 22 mounted to frame A adjacent and above the feed end of belt B. The plastic film material is guided to travel forwardly on an incline down to a position in closely spaced juxtaposition to belt B in the packaging area generally indicated at 25 in the drawings.

Heaters 26 and 27 are arranged to face the plastic film as it travels in its downward inclining path to uniformly heat the body of the film as it travels downwardly into juxtaposition with belt B.

A vacuum chamber 29 is mounted under the top face of belt B in the packaging area 25 in a position to withdraw air through the foraminous belt and thereby cause atmospheric pressure to compress the flexible hot molten plastic material down into contour tight formation with the article to be packaged resting on the belt.

A cutting mechanism C is arranged in the end of belt B to cut the packaged material along predetermined lines as the material is metered out of the packaging device. It can be seen that the device thus is capable of a continuous packaging operation in which there is no need for the usual reciprocal movement of the sheet material and the periodic insertion of material to be packaged as previously accomplished in the prior art.

Polyethylene or other film material 21 is sandwiched between upper guide belts 30 and lower guide belts 31. The guide belts are mounted on rollers 33, 33A, 34, 34A, 35 and 35A which are arranged to carry the film in a descending path past the heaters and thence downwardly via rollers 34 and 34A in a substantially horizontal plane in closely spaced relationship to the stretch of belt B. By this means any package that is carried on the belt is carried with the belt into engagement between the film and the belt. Thereafter when the belt passes vacuum chamber 29 the film is drawn tightly onto the packaged material by virtue of the vacuum force.

A blower 40 is mounted over the vacuum station to add cooler air to the material to assist in its cooling and to provide something slightly in excess of atmospheric pressure on top of the film.

The vacuum forming chamber may include a funnel type arrangement in which a pump 42 is arranged to withdraw air at a sufficient rate to create the necessary vacuum for the vacuum forming.

Belts 30 and 31 are driven by a belt mechanism 45 arranged to be driven from rollers 16. Roller 16 in turn is driven from motor 18 by a belt 46. The cutter is provided with a guillotine type chopper blade 48 which is operated reciprocally by a blade reciprocating mechanism indicated at 49 to chop the material as it comes past the chopping station. An actuating mechanism 50 can be provided to time the blade to chop at the proper interval to separate packaged items.

In operation motor 18 is turned on therein causing belt 30 to rotate in the direction as indicated by arrow 20. The roll or web of sheet material 21 is placed on its vertical arms 22 with the roll sandwiched between belts 30 and 31.

Heaters 26 and 27 are arranged to heat the sheet material to a sufficiently high temperature to increase the plasticity to a point where the sheet is readily adaptable to vacuum forming. Air permeable baseboards with the article to be packaged are then placed on belt 30 and carried by the belt to the position under the film and over the vacuum forming station where the air is drawn by vacuum chamber 29 to cause the sheet to be brought tightly thereagainst. Cooler air from blower 40 is directed to cool the sheet subsequent to the contour formation of the sheet on the article to be packaged.

The board with the sheet formed and attached thereto is then drawn past the cooling station where blade 48 is arranged to chop the board along transverse lines between packaged articles. The sheet material is drawn at substantially the same speed as belt 30 so that there is no relative longitudinal movement between the sheet material and the belt at the vacuum forming station nor in the area where the material engages the article to be packaged.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A packaging machine for affixing a thin plastic film web onto a product to form a plastic film cover over the product comprising an endless air permeable belt, means for continuously moving said belt in one direction, vacuum creating means mounted under the belt to draw air downwardly through the belt, and means supporting the web from the sides of the web for drawing said web downwardly to a position spaced a short distance above the belt and for moving the web along the longitudinal axis of said belt at a rate of movement equal to the rate of movement of said belt.

2. A packaging machine for affixing a thin plastic film web onto a baseboard carrying a product to form a plastic film cover over the product and baseboard comprising an endless air permeable belt, spaced drum means mounted on opposite ends of said belt to create upper and lower horizontal belt stretches, means for rotating said belt on said drum means in one direction, vacuum creating means mounted between the upper and lower stretches of said belt to draw air downwardly through the upper stretch of said belt, means for mounting the web above said belt, guide means tightly supporting opposite sides of the web to guide the web downwardly to a position in closely spaced parallel alignment with the upper stretch of said belt, means moving said guide means to carry said web over the top of the upper stretch of said belt at a rate equal to the movement of the stretch of said belt, and heat means mounted above said belt to heat said web as it is drawn over the top stretch of said belt.

3. A packaging machine for affixing a thin plastic film web onto a product to form a plastic film cover over the product comprising air permeable belt means for carrying a product along a horizontal path at a predetermined constant rate of travel, means engaging the web only along the outer edges of the web for drawing the web over products carried by said belt means at a rate of travel equal to the rate of travel of said belt means, and means for creating a substantially less than atmospheric pressure at the top face of said belt means to cause the web to be drawn tightly against said belt means and products carried thereby by atmospheric pressure.

4. A packaging machine for affixing a thin plastic film web onto a product to form a plastic film cover over the product comprising belt means for carrying a product along a horizontal path at a predetermined constant rate of travel, means engaging the web only along the outer edges of the web for drawing the web over products carried by said belt means at a rate of travel equal to the rate of travel of said belt means, vacuum means for creating substantially less than atmospheric pressure at the top face of said belt means to cause the web to be drawn tightly against the belt means and products carried thereby by atmospheric pressure, and means to heat said web prior to being drawn over said belt means.

5. A device according to claim 4 and having cooling means mounted above the web at a position in advance of said vacuum means.

6. A device for continuously forming vacuum formed packages comprising an air permeable endless belt, means for mounting a sheet of plastic film material at a position elevated above said belt, roller means engaging said film material along the outer edges thereof for holding said film material in a taut condition and pulling the film material down to a position slightly above said belt and thence parallel with said belt in spaced relation thereto, means for rotating said belt at a continuous substantially constant rate of speed, means for drawing said film material to move along the longitudinal axis of said belt at substantially the same speed as said belt, heating means to heat said film material as it is drawn downwardly from elevated position, and vacuum means mounted under the top stretch of said belt under the area where the film material is being drawn in parallel relationship to the belt.

7. A device according to claim 6 having a cutting blade mounted at the end of said belt to cut material passing therethrough.

8. A method for affixing a thin plastic film on a product to form a plastic film cover over the product comprising the steps of: moving a product along a horizontal plane at a constant uninterrupted predetermined rate; pulling a sheet of plastic material from two sides of the sheet material under taut conditions from an elevated position down to a closely spaced parallel relationship to the plane of movement of the product; heating the sheet material as it is being drawn downwardly; and creating an area of negative pressure about the product as it is traveling under the sheet material.

9. A method for affixing a thin plastic film on a baseboard carrying a product to form a plastic film cover over the product and baseboard comprising the steps of: moving the baseboard at an uninterrupted constant rate of speed along a predetermined plane; supporting a sheet of plastic material only along its two opposite sides; moving the sheet of plastic material held under taut conditions in closely spaced parallel relationship above the plane of movement of said baseboard; and drawing air through the baseboard to cause atmospheric pressure to force the plastic film against the baseboard.

10. A method for affixing a thin plastic film on a product to form a plastic film cover over the product comprising the steps of: moving the product at a constant uninterrupted rate of speed along a predetermined plane; supporting a sheet of plastic material only along its two opposite sides; continuously moving the sheet of plastic material in closely spaced parallel relationship above the plane of movement of said product; heating the sheet of plastic material; and drawing air from the area about the product to cause atmospheric pressure to force the sheet of plastic material against the product.

References Cited in the file of this patent

UNITED STATES PATENTS

| | | |
|---|---|---|
| 2,546,721 | Campbell | Mar. 27, 1951 |
| 2,888,787 | Cloud | June 2, 1959 |
| 2,927,409 | Heyer | Mar. 8, 1960 |